Oct. 11, 1938. R. D. NICHOLS 2,132,756
METHOD AND APPARATUS FOR CLEANING SEWAGE GRIT
Filed Oct. 29, 1936 2 Sheets-Sheet 1
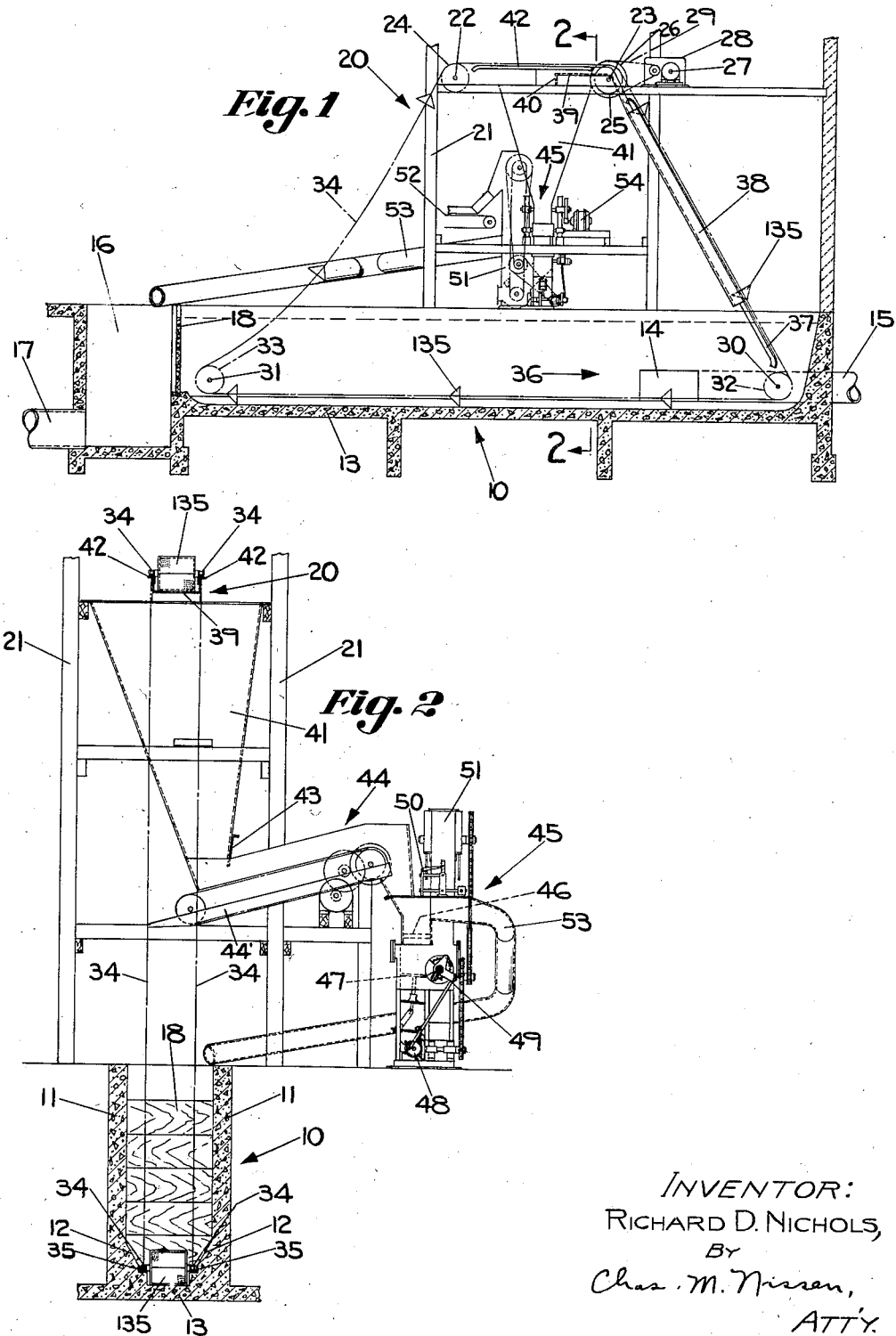
INVENTOR:
RICHARD D. NICHOLS,
BY
Chas. M. Nissen,
ATT'Y.

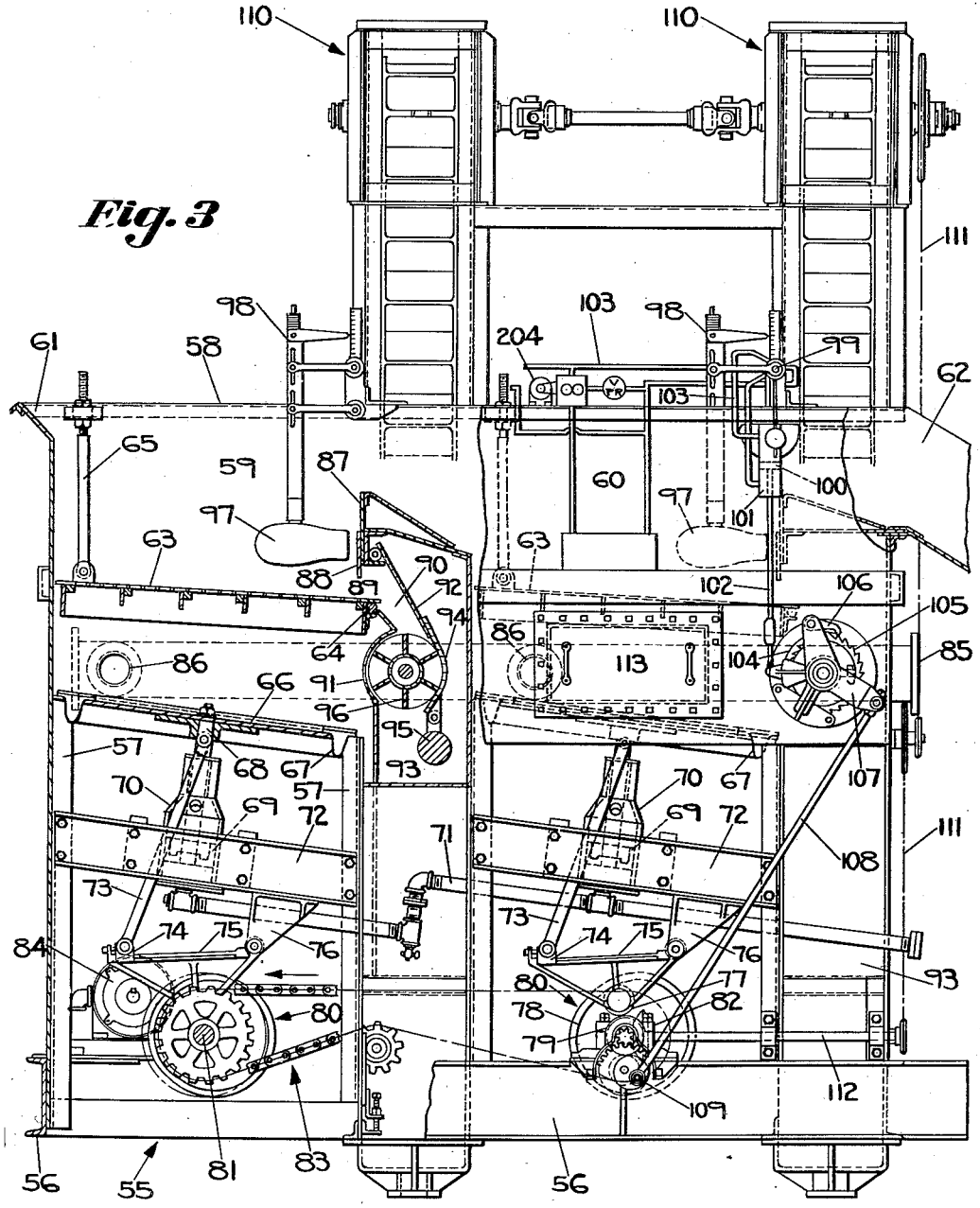

Patented Oct. 11, 1938

2,132,756

UNITED STATES PATENT OFFICE 2,132,756

METHOD AND APPARATUS FOR CLEANING SEWAGE GRIT

Richard D. Nichols, Columbus, Ohio, assignor to The Jeffrey Manufacturing Company, a corporation of Ohio Application October 29, 1936, Serial No. 108,246

7 Claims. (Cl. 210—3)

This invention relates to a method of and apparatus for cleaning sewage grit.

An object of the invention is to provide an improved method of and apparatus for cleaning sewage grit in which the sewage grit is permitted to settle in a grit settling tank with some organic matter and in which the settled grit and organic matter are accumulated and delivered to a jig where it is subjected to a jigging operation to effect a separation of the grit and organic matter, thereby to obtain a clean grit, the removed organic matter being returned to the sewage apparatus for further treatment.

Other objects of the invention will appear hereinafter, the novel features and combinations being set forth in the appended claims.

In the accompanying drawings,

Fig. 1 is a longitudinal sectional elevational view of the device comprising my invention which may be operated to carry out the method of my invention;

Fig. 2 is a transverse sectional elevational view of the device of Fig. 1 taken on the line 2—2 of Fig. 1 looking in the direction of the arrows; and Fig. 3 is a side elevational and sectional view of a jig which may be employed.

In the treatment of sewage it is necessary as a step preliminary to the digestion of organic matter, to settle out and remove the undigestible grit. The problem of washing this grit to remove adhering foreign matter and foreign matter which settles therewith, such as putrescible organic matter, presents a major problem in sewage disposal apparatus. It is, of course, desirable to free the grit of all organic matter so that a clean grit may be obtained which is free of objectionable odors. It is also desirable that all of the organic matter be subjected to a decomposition treatment, such as a digestion treatment.

The apparatus herein disclosed and the method of my invention provides for a very efficient cleaning of the grit with a returning of the organic matter to the sewage stream for complete treatment.

Referring to the drawings, the apparatus of my invention comprises a grit channel or grit settling tank 10 formed by a pair of spaced upstanding side walls 11, 11 which have tapering bottom portions 12, 12 and a bottom wall 13, said grit channel 10 being preferably formed as a monolith of poured concrete.

Adjacent one end of the grit channel 10 I provide an influent opening 14 at the discharge end of an influent conduit 15. Adjacent the other end of the grit channel 10 I provide an effluent sump 16 from which leads an effluent conduit 17. An adjustably overflow weir 18, formed by a plurality of stacked removable boards or planks, is provided between the sump 16 and the main body of the grit channel 10. It will be evident that by varying the number of planks of weir 18, the normal level of the sewage in the grit channel 10 may be variably determined; that is, the depth in the grit channel may be varied and predetermined.

It will be evident that sewage may flow into the grit channel 10 through influent conduit 15 and opening 14, in which grit channel 10 the grit may settle to the bottom 13 while the fluid sewage and floating matter may flow over the weir 18 into the effluent sump 16 and therefrom by way of the effluent conduit 17 to the subsequent primary and secondary settling tanks of the complete sewage treating system.

Cooperating with the grit channel 10 to provide for the removal of the settled grit and any settled foreign matter, such as putrescible organic matter, I provide a conveyor mechanism 20. Said conveyor mechanism 20 may be generally of the form disclosed in Figs. 9 to 12, inclusive, of the co-pending application of Robert E. Briggs, Serial No. 701,550, for Material treating apparatus, filed December 8, 1933.

Briefly described, said conveyor mechanism 20 comprises an upstanding frame 21 carrying a pair of spaced transverse shafts 22 and 23 which are rotatably supported by appropriate journal bearings and carry at each end a sprocket. One sprocket 24 is seen associated with shaft 22 and one sprocket 25 is seen associated with shaft 23 in Fig. 1 of the drawings. A third sprocket 26 will be associated with the shaft 23 and will be driven from an electric motor 27 through appropriate speed reduction mechanism 28 and drive chain 29.

Within the grit channel 10 I provide a pair of shafts 30 and 31, shaft 30 being adjacent the influent end and shaft 31 being adjacent the effluent end thereof. Said shafts 30 and 31 may be supported from the side walls 11, 11 of the grit channel 10 by appropriate journal bearings and each may carry a sprocket at each end thereof. One sprocket 32 associated with shaft 30 and one sprocket 33 associated with shaft 31, are seen in Fig. 1 of the drawings.

Carried on the sprockets 24, 25, 32 and 33 is a pair of spaced continuous draft chains 34, 34. As best seen in Fig. 2 of the drawings, the draft chains 34, 34 will ride on appropriate angle members 35, 35 embedded in the tapered portions 12, 12 of the side walls 11, 11 during their travel between the sprockets 33 and 32.

Carried between said draft chains 34, 34 are a plurality of V-buckets 135 which are preferably perforated to permit the free drainage of liquid. It will be evident that the motor 27, when operated, may drive the shaft 23, thereby to drive the continuous draft chains 34, 34 and to cause the buckets 135 to scrape settled grit from the bottom of the grit channel 10 and convey it from the effluent end thereof toward the influent end, when operating in the direction of the arrow 36.

Between the sprockets 32 and 25 I provide spaced rails 37, 37 which support the draft chains 34, 34 during this portion of their travel and between said rails 37, 37 I provide a drain chute 38 which directs the drained liquid which flows through the perforate bottoms of the buckets 135, back into the grit channel 10.

After a bucket 135 has passed over the sprocket 25 it will dump its contents onto a flat platform 39 over which the dumped material will be scraped by the bucket until it falls over a ledge 40 of said platform, into a large receiving hopper 41. I also preferably provide supporting rails 42, 42 for the draft chains 34, 34 between the sprockets 24, 24 and 25, 25. It will thus be seen that the conveyor mechanism 20 will be effective when operated, to collect settled grit from the bottom 13 of the grit channel 10 and deliver it to the receiving hopper 41. In practice, it is preferred that the conveyor mechanism 20 be operated intermittently when the grit channel 10 is in operation.

Associated with the bottom of the hopper 41 is a variable controllable gate 43 which controls the discharge of the accumulated grit in said hopper 41 to an apron conveyor mechanism 44, which preferably slopes upwardly from the receiving end to the discharge end, said discharge end being positioned to discharge the grit into a jig 45. It may be noted that, due to the slope of the conveyor mechanism 44, any liquid which is received thereby will flow over the lefthand end, as viewed in Fig. 2, and will drop into the grit channel 10. A drain chute 44' may be placed under the endless belt conveyor 44, as shown in Fig. 2. Thus, with the perforated buckets 135 and the drain afforded by the conveyor mechanism 44, the grit will have been drained of much of its water when delivered to the jig 45.

The jig 45 may be of standard construction familiar in the art of coal cleaning and ore concentration, and may be a single compartment jig of the type disclosed in Figs. 1 and 2 or Figs. 3 and 4 of the application of Byron M. Bird et al., Serial No. 736,442, for Apparatus for treating mineral materials, filed July 23, 1934.

Briefly described, said jig 45 will comprise a screen 46 over which the grit will travel. Upward and downward pulsations of water relative to said screen 46 will be effected by a diaphragm 47 operated from an appropriate drive mechanism 48. In the operation of the jig the grit will be subjected to the upward pulsating movements of water which will be effective to clean each individual grit particle of adhering foreign matter, and at the same time to stratify the bed of materials with the high gravity grit on the bottom and any lighter gravity inorganic materials above, with the organic matter on top, if not actually floating in the water. This jigging operation effects a very thorough washing operation because when each successive upward pulsation begins, the bed is closed with the grit particles in contact with one another. Consequently the beginning of each upward impulse to open the bed for the stratification step causes swift upward currents of water between the particles to thoroughly wash them of adhering organic matter.

Associated with the screen 46 will be a grit ejector mechanism 49 which will be automatically controlled by appropriate float control mechanism 50 to maintain the depth of the grit bed at a predetermined value. The accumulated grit will thus be discharged into the boot of a grit elevator 51 by which it will be discharged onto a belt conveyor 52 and conveyed to a grit pile.

The released foreign matter will flow from the jig 45 by way of conduit 53 by which it is directed to the effluent sump 16, where it will be reunited with the sewage and carried on for further treatment by the complete sewage treating apparatus.

An appropriate electric motor 54 will be provided for driving the drive mechanism 48, for oscillating the diaphragm 47, for oscillating the grit ejector mechanism 49, and for operating the grit elevator 51.

Instead of employing a single compartment jig, as illustrated in Figs. 1 and 2 of the drawings, I may employ a two compartment jig, as illustrated in Fig. 3 of the drawings. It may also be mentioned that the jig disclosed in Figs. 1 and 2 of the drawings may follow substantially the construction illustrated in Fig. 3 except that only one compartment thereof will be provided.

Said two compartment jig illustrated in Fig. 3 comprises a main frame 55 formed by longitudinal and transversely extending bottom channels 56 and upwardly extending angle members 57. Upon the main frame 55 is supported a tank 58 provided with two compartments 59 and 60. The compartments 59 and 60 will be of similar construction except for obvious differences which are principally that the compartment 59 is provided with a feed chute 61 and the compartment 60 is provided with a discharge chute 62. Within each of said compartments 59 and 60 is a perforate material supporting plate 63, pivoted at its forward end on a transverse rod 64 and mounted upon adjustable hangers 65 at its rear end. The plate 63 will provide a support for the material undergoing a jigging operation.

Positioned below the plate 63 in the bottom of the compartment 59 or 60 which comprises a disc-shaped diaphragm 66, the cylindrical periphery of which is attached to the tank walls by a flexible ring 67 preferably made of fabricated rubber. Said ring 67 will permit reciprocatory motion of the diaphragm 66 for the purpose of causing water in the tank 58 to move cyclically up and down through screen 63.

Rigidly attached to the diaphragm 66 is a piston rod 68 carrying at its lower end a piston 69 which reciprocates in a cylinder 70. The cylinder 70 is attached to a pressure air line 71 which applies pressure to the lower side of the piston 69 to balance the weight of the load on the diaphragm 66. As a consequence the energy required to reciprocate the diaphragm 66 is greatly reduced. The cylinder 70 is preferably mounted between a pair of channel members 72 which are rigidly attached to the main frame 55.

To provide for reciprocation of the diaphragm 66 I provide a pitman 73 pivotally attached to the piston rod 68 and to a slide block 74 slidably adjustable on a pivoted walking beam 75, which beam 75 is, in turn, pivotally attached to a bracket 76 carried by the channel members 72.

The walking beam 75 carries a roller 77 which rides between upper and lower cam surfaces 78 and 79, respectively, of a cam 80. Cam 80 is mounted upon a transversely extending shaft 81 supported upon the main frame 55 by appropriate journal bearings, one of which is seen at 82. It will be evident that there will be two of said cams 80 and shafts 81, and said shafts 81 are connected together by appropriate chain and sprocket mechanism 83. One of said shafts 81 is driven directly from an electric motor 84, and the other is driven from said first shaft 81 through the chain and sprocket mechanism 83.

It is preferred that the diaphragms 66 in the two compartments 59 and 60 be adjusted to operate 180 degrees out of phase thereby to equalize the load on the motor 84. However, any other adjustment may be made, and if desired, they may be operated in phase.

It will be evident that adjustment of the slide block 74 on the walking beam 75 will adjust the stroke of the diaphragm 66 during each cycle of operation.

To supply the jigging water to the two compartments 59 and 60 I provide a longitudinally extending water pipe 85 with individual lead pipes 86, one for each of said compartments 59 and 60.

Each of said compartments 59 and 60 is also provided with a weir 87 having a vertical adjustable bottom plate 88 to adjust the size of an opening 89 leading to a grit discharge chute 90 formed by a stationary plate 91 and a pivoted plate 92 and leading to a grit discharge boot 93. Pivoted plate 92 is rigidly attached to an arcuate wear plate 94 to the bottom of which is attached a pivoted weight 95. The plate 91 is also arcuate opposite the plate 94. Between the plates 91 and 94 is a paddle wheel type of grit discharge valve 96 which controls the rate of discharge of grit into the boot 93.

To provide for uniform conditions of treatment of the grit, thereby to insure a thorough cleaning thereof, I provide automatic float responsive control mechanism for each of the valves 96 which maintains a bed of grit on the plate 63 at a uniform depth. Said float control mechanism comprises a float 97 of the totally submerged type carried on a parallel motion link mechanism 98, and controls a valve 99 which, in turn, controls a piston 100 in a cylinder 101, which piston 100 is attached to the end of a rod 102.

The valve 99 controls the application of fluid to the cylinder 101, and is operative to lock the piston 100 in any position to which it is adjusted. Fluid under pressure controlled by the valve 99 is supplied from a fluid system 103, operated from a constantly rotating motor 204. In the normal position of the float 97 the valve 99 would operate to lock the piston 100 in the cylinder 101. Should the float 97 move upwardly, valve 99 will operate to move the piston 100 downwardly, thus moving the rod 102 downwardly. A reverse movement of the float 97 will cause a reverse movement of the rod 102. The rod 102 is pivotally attached to a shield mechanism 104, which controls variably the angular rotation of a ratchet wheel 105 which is operated by a pawl 106 carried by a constantly reciprocating bell crank lever 107 which is reciprocated by the shaft 81 by an appropriate rod 108 and a crank mechanism 109. It is thus evident that the angular rotation in step-by-step fashion of the valve 96 for each reciprocation of the bell crank lever 107 will be determined by the position of the float 97. This will insure the maintenance of a bed of grit o. substantially constant depth on the perforate plate or screen 63.

To remove the cleaned grit from the boots 93 of the two compartments 59 and 60, bucket type elevator mechanisms 110 are provided in association with each of said boots 93, which elevator mechanisms 110 are driven from the motor 84 through the chain and sprocket mechanism 83 and through a chain and sprocket mechanism 111, driven from a shaft 112 which is driven from the shaft 81 associated with compartment 60. To provide access to the compartments 59 and 60 below the screens or perforate plates 63 each of said compartments 59 and 60 is provided with a removable door 113.

The operation of the two compartment jig disclosed in Fig. 3 is essentially the same in the system as the operation of the single compartment jig 45, except, however, that in the two compartment jig different adjustments for the strokes of the diaphragms 66 in the compartments 59 and 60 may be differently effected, and likewise the automatic grit discharge mechanism may be differently adjusted. Said two compartments 59 and 60, and the operating elements associated therewith, are preferably so adjusted that the heavier grit will be removed in the first compartment 59 and the compartment 60 will operate as a clean-up compartment to remove any grit which may be of lighter specific gravity. Thus, by employing a two compartment jig instead of a single compartment jig, I am assured of a complete removal of all of the grit with the return to the sewage disposal system of nothing but organic matter, which may be properly treated in the digester.

In the operation of the apparatus comprising my invention with the consequent realization of the method of my invention, sewage containing grit will be introduced into the grit channel or grit settling tank 10 by way of the influent conduit 15 and influent opening 14. The sewage will flow through said grit channel 10 at a relatively slow rate to prevent the settling of most of the organic material but at a rate which will result in the settling of the inorganic materials including the finer particles and lighter gravity inorganic materials; that is, at such a rate as will induce the settling of substantially all of the grit in the sewage. The sewage level in the grit channel 10 will be maintained at any desired height by the adjustable overflow weir 18. The sewage, devoid of settled grit will flow from the effluent sump 16 by way of the effluent conduit 17.

The velocity of the flow through the tank 10 will determine the settling rate of the settled material. Therefore, the rate of flow should be slow enough that the smallest particles of inorganic solids will settle. This slow velocity will permit settling of some of the organics. As a consequence, there will be some matting of solids or grit entrapped in the organic material which increases the difficulty of washing the grit. The jig is particularly useful in effecting a complete separation of the grit and organic matter even after this matting action has taken place because of the violent washing and scrubbing action which takes place within the jig compartment or compartments. It may also be noted that this matting action is somewhat encouraged by the removal of the grit from the fluid channel because of the reduction of moisture content thereof, but the jig is able to effect a very efficient separation, and thus to provide a very clean grit in spite of this matting action.

The settled grit together with settled free and adhering foreign matter, which will be principally putrescible organic matter, will be scraped from the bottom of the grit channel 10 by the buckets 135 of the conveyor mechanism 20 and delivered to the large receiving hopper 41. This scraping operation is also relatively slow so as not to disturb the settling of such inorganic matter as is slow to sink. Due to the perforations in the buckets 135 the grit with such adhering foreign matter, will be received by the hopper 41 relatively free of water which will be drained therefrom and guided by the drain chute 38 into the grit channel 10. Further draining of the grit within the receiving hopper 41 will be effected with the water flowing over the rear end of the conveyor mechanism 44 and into the grit channel 10.

The conveyor mechanism 44 and the jig 45 will be operated preferably at intermittent intervals and after the receiving hopper 41 has received an appreciable amount of grit whereby said grit will be subjected to a jigging operation which will be effective first to wash the grit free of adhering foreign matter, and then to form a relatively heavy gravity clean grit in a bed on the screen 46 of the jig 45, from which it will be removed by the grit ejector mechanism 49 and delivered by the elevator 51 to a belt conveyor 52, while the relatively light gravity inorganic materials are separately removed.

The freed organic matter with the jigging water introduced into the jig 45 will flow from said jig 45 by way of the conduit 53 to the effluent sump 16 where it will be re-united with the sewage, which sewage will be further treated by the following sewage treating apparatus.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. The method of cleaning sewage grit which comprises settling grit and organic matter from sewage, collecting and storing the grit and organic matter under conditions favoring the drainage of liquid therefrom, thereafter subjecting the grit and organic matter to a jigging operation to separate and stratify the grit and organic matter separately, and separating the stratified grit from the organic matter.

2. In sewage treating apparatus, the combination with a sewage grit settling tank, of a jig, and means constructed and arranged to deliver settled grit from said tank to said jig.

3. In sewage treating apparatus, the combination with a sewage grit settling tank, of a jig, conveyor means constructed and arranged to collect settled grit while draining it of liquid which flows back into the tank and delivers the de-watered grit to said jig.

4. The method of cleaning sewage grit which comprises settling grit from sewage, removing the settled grit and forming it into a bed, subjecting the bed of grit to a washing and stratifying operation by directing water through said bed in cycles of successive upward and downward movements to wash it of adhering organic matter and stratify the cleaned grit in the bottom of said bed, directing the water and organic matter washed from the grit to the sewage stream, and removing the washed grit from the bed.

5. The method of cleaning sewage grit which comprises settling grit from sewage, removing the settled grit and adhering organic matter and forming it in a bed, subjecting said bed of grit and adhering organic matter to a combined scrubbing and stratifying action by causing a periodic reversal of water flow upwardly and downwardly therethrough thereby freeing the grit of adhering organic matter, directing water and organic matter into one channel and removing the clean grit and directing it into another channel.

6. The method of cleaning sewage grit which comprises settling inorganic and organic solids from sewage, collecting the settled solids, forming the solids into a bed, subjecting said bed to alternate controlled upward and downward currents of liquid to separate the inorganics from the organics, and discharging said separated solids as separate products.

7. The method of cleaning sewage grit which comprises settling inorganic and organic solids from sewage, collecting the settled solids, forming the solids into a bed, subjecting said bed to alternate controlled upward and downward currents of liquid to separate the inorganics from the organics, dewatering and discharging said inorganic solids for disposal, and returning the organics to the sewage.

RICHARD D. NICHOLS.